(12) United States Patent
Jeon et al.

(10) Patent No.: US 8,849,277 B2
(45) Date of Patent: Sep. 30, 2014

(54) COOPERATIVE SCANNING-BASED CELL RESELECTION METHOD AND SYSTEM IN WIRELESS COMMUNICATION SYSTEM

(75) Inventors: Young Hyun Jeon, Guri-si (KR); Jong Hyung Kwun, Seoul (KR); Jung Hoon Cheon, Suwon-si (KR); Chan Ho Min, Seoul (KR); Jae Hyun Kim, Seoul (KR); Hyun Jin Lee, Pohang-si (KR); Sin Hun Kang, Daegu Metropolitan (KR)

(73) Assignees: Samsung Electronics Co., Ltd., Suwon-si (KR); Ajou University Industry Academic Cooperation Foundation, Suwon-si (KR)

( * ) Notice: Subject to any disclaimer, the term of this patent is extended or adjusted under 35 U.S.C. 154(b) by 473 days.

(21) Appl. No.: 13/129,470

(22) PCT Filed: Nov. 13, 2009

(86) PCT No.: PCT/KR2009/006702
§ 371 (c)(1),
(2), (4) Date: May 16, 2011

(87) PCT Pub. No.: WO2010/056072
PCT Pub. Date: May 20, 2010

(65) Prior Publication Data
US 2011/0230187 A1    Sep. 22, 2011

(30) Foreign Application Priority Data
Nov. 14, 2008 (KR) .................. 10-2008-0113636

(51) Int. Cl.
| | | |
|---|---|---|
| H04W 4/00 | (2009.01) | |
| H04W 48/16 | (2009.01) | |
| H04B 7/26 | (2006.01) | |
| H04W 84/00 | (2009.01) | |
| H04W 84/04 | (2009.01) | |

(52) U.S. Cl.
CPC ............ *H04W 48/16* (2013.01); *H04W 84/005* (2013.01); *H04W 84/047* (2013.01); *H04B 7/2606* (2013.01)

USPC ........................................ 455/434; 455/432.1

(58) Field of Classification Search
CPC ..... H04W 36/00; H04W 36/02; H04W 36/04; H04W 36/06; H04W 36/08; H04W 36/10; H04W 36/12; H04W 36/14; H04W 36/16; H04W 36/18; H04W 36/20; H04W 36/22; H04W 36/26; H04W 36/28; H04W 36/30; H04W 36/32; H04W 36/34; H04W 36/36; H04W 36/38; H04W 48/00; H04W 48/02; H04W 48/04; H04W 48/06; H04W 48/08; H04W 48/10; H04W 48/12; H04W 48/14; H04W 48/16; H04W 48/18; H04W 48/20; H04W 84/005; H04W 84/047; H04B 7/2606
USPC ........... 455/422.1, 434, 464, 432.1, 436–444; 370/328, 329, 331–333
See application file for complete search history.

(56) References Cited

U.S. PATENT DOCUMENTS

| | | | |
|---|---|---|---|
| 7,668,504 B2 * | 2/2010 | Kang et al. .................. | 455/11.1 |
| 8,175,004 B2 * | 5/2012 | Chang et al. ................. | 370/254 |
| 2007/0060048 A1 | 3/2007 | Kang et al. | |

(Continued)

*Primary Examiner* — Ajit Patel
(74) *Attorney, Agent, or Firm* — Jefferson IP Law, LLP (57) ABSTRACT

A cell reselection method and system based on a cooperative scanning of the mobile relay station and mobile stations is provided for facilitating cell reselection procedure in a Broadband Wireless Access (BWA) system. The cooperative scanning method for a moving wireless network including a mobile relay station and at least one mobile station according to the present invention includes transmitting, at the moving wireless network, a scanning request with cooperative scanning duration to a serving base station; assigning, when a scanning response, neighbor base stations to the mobile relay station and at least one mobile station; scanning, at the mobile relay station and the at least mobile station, the assigned neighbor base stations; and transmitting scanning results to the serving BS station.

11 Claims, 10 Drawing Sheets

(56) References Cited

U.S. PATENT DOCUMENTS

| | | |
|---|---|---|
| 2007/0105585 A1 | 5/2007 | Lee et al. |
| 2007/0123292 A1* | 5/2007 | Kang et al. .................... 455/525 |
| 2007/0264933 A1 | 11/2007 | Kang et al. |
| 2008/0045210 A1* | 2/2008 | Kaaja et al. ................... 455/434 |
| 2008/0125125 A1 | 5/2008 | Choi et al. |
| 2009/0221287 A1* | 9/2009 | Balasubramanian et al. ............................ 455/434 |
| 2009/0303918 A1* | 12/2009 | Ma et al. ....................... 370/315 |

* cited by examiner

Fig. 14

COOPERATIVE SCANNING-BASED CELL RESELECTION METHOD AND SYSTEM IN WIRELESS COMMUNICATION SYSTEM

TECHNICAL FIELD

The present invention relates to a wireless communication system and, in particular, to a cell reselection method and system based on a cooperative scanning that is capable of facilitating cell reselection procedure in a Broadband Wireless Access (BWA) system.

BACKGROUND ART

Institute of Electrical and Electronics Engineers (IEEE) 802.16e Mobile WiMAX specifies a cell reselection procedure in which a Mobile Station (MS) measures signal strengths of neighbor base stations (BSs) using network topology information acquired from the MOB_NBR-ADV message broadcast by the serving BS and selects a target BS based on the measurement result.

Figure 1:
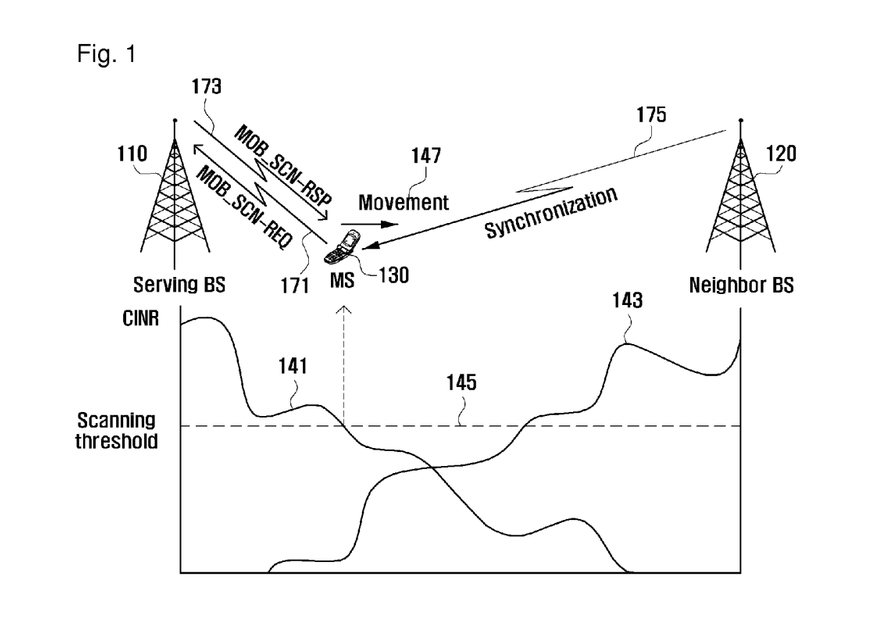
FIG. 1 is a diagram illustrating a general cell selection procedure of a MS in a wireless communication system.

FIG. 1 is a diagram illustrating a general cell selection procedure of a MS in a wireless communication system.

In FIG. 1, reference numeral 110 denotes a serving BS, 120 denotes a neighbor BS, 130 denotes a MS, 141 denotes a Carrier to Interference plus Noise Ratio (CINR) of the serving BS 110 measured by the MS 130, 145 denotes a scanning threshold triggering the MS 130 to start scanning for cell selection, and 147 denotes a movement direction of the MS 130.

If the scanning threshold is detected, the MS 130 transmits a MOB_SCN-Request message to the serving BS 110 for scanning as denoted by reference numeral 171, and the serving BS 110 replies by transmitting a MOB_SCN-RSP message containing information required for selecting the neighbor BS 120 as denoted by reference numeral 173.

The cell reselection procedure can be triggered by the MS 130 when a specific condition is fulfilled or by the serving base station 110 without request from the MS 130. In the cell reselection procedure, the serving BS can acquire the physical layer parameters and potential service level and network information through an association ranging with the neighbor BSs, and three association levels are proposed in the standard: association without coordination, association with coordination, and network assisted association report.

In the association without coordination, the neighbor BS has no information about the MS and thus provides the MS with only contention-based ranging allocations. After the receiving a ranging code, the BS sends an RNG-RSP message with ranging status 'success' and allocates resource for the MS to transmit RNG-REQ message with TLV parameters (including serving BS ID and MS MAC address) related to the association ranging.

In the association with coordination, the serving BS provides association parameters to the MS and coordinates association between the MS and neighboring BSs. The serving BS provides the parameters such as ranging code to be used for the association ranging with the neighbor BSs and ranging start time. After ranging code, the same procedure is performed as in the association without coordination.

In the network assisted association report, the MS transmits the RNG-REQ message in similar way to the contention based association or non-contention based association. However, the MS receives the RNG_RSP message sent by the neighbor BS from the serving BS. At this time, the serving BS sends a MOB_ASC_REPORT message containing the information about the neighbor BSs to the MS.

Figure 2:
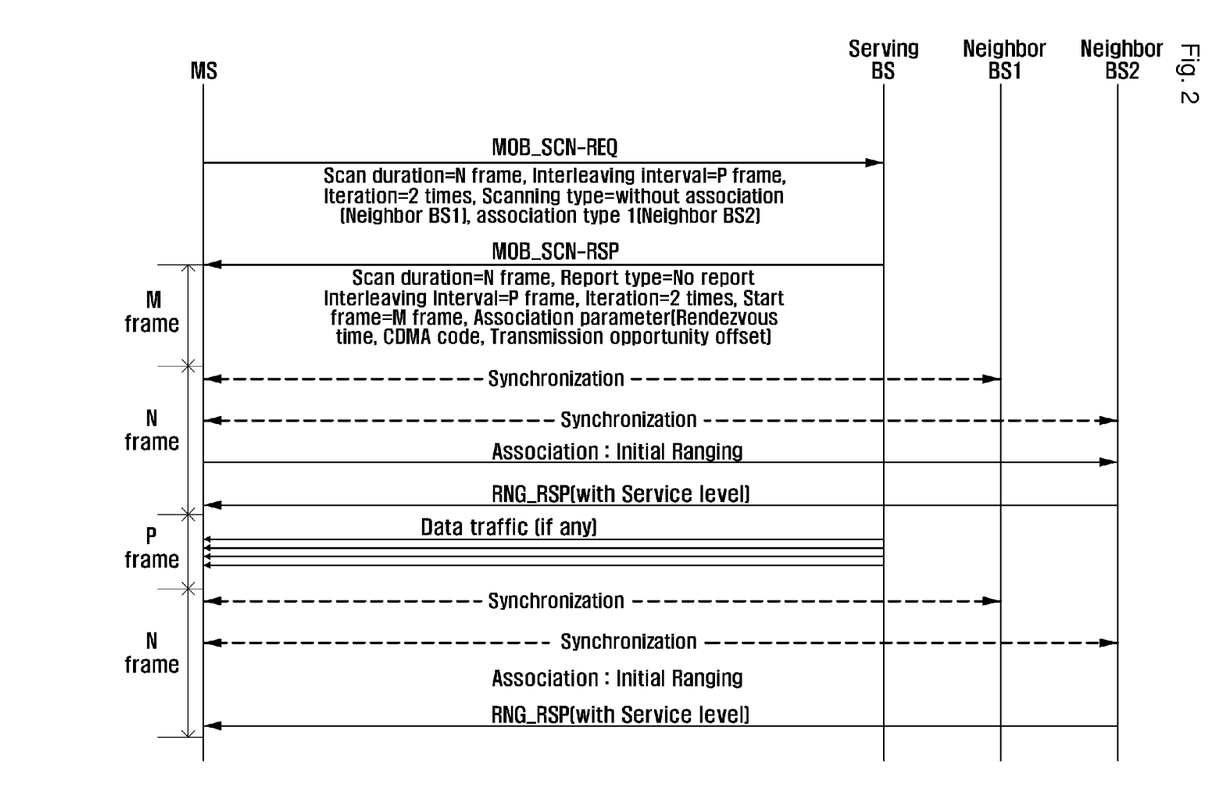
FIG. 2 is a sequence diagram illustrating signaling among the MS and serving and neighbor BS during the scanning procedure in a conventional wireless communication.

FIG. 2 is a sequence diagram illustrating signaling among the MS and serving and neighbor BS during the scanning procedure in a conventional wireless communication.

Referring to FIG. 2, the MS first sends a MOB_SCN-REQ message with scanning parameters to the serving BS. Upon receipt of the MOB_SCN-REQ message, the serving BS sends the MS a MOB_SCN-RSP message with scanning duration and start time, scanning result report type, neighbor BSs information, etc. After a number of frames (M frames) designated by the serving BS elapse, the MS performs synchronization with the neighbor BSs, B1 and B2, in a predetermined number of frames (N frames). In FIG. 2, it is assumed that the scanning iteration is set to 2.

In the meantime, IEEE 802.16j standard specifies about Mobile Relay Station (MRS) which is installed in a bus or train for providing wireless access service to the MSs on it. The MRS supports the handover between neighbor BSs to avoid service loss as the MS does. The MRS can acquire the scanning information of the MS served by the MRS from the MOB_SCN-INFO message transmitted by the serving BS for scheduling the MSs.

Figure 3:
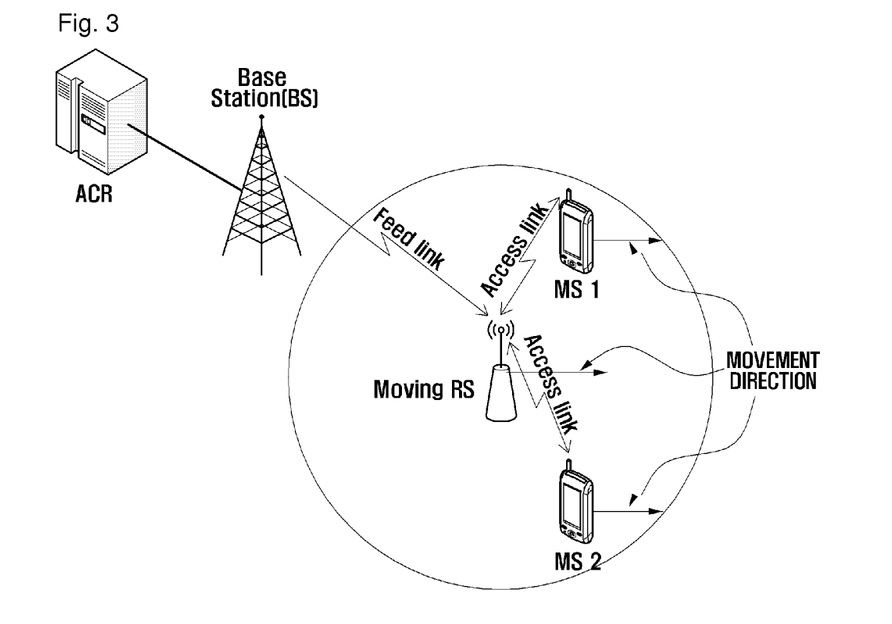
FIG. 3 is a diagram illustrating an exemplary moving wireless network including an MRS.

FIG. 3 is a diagram illustrating an exemplary moving wireless network including an MRS.

The moving wireless network is a network in which the MRS and the MSs, MS1 and MS2, connected to the MRS moves in the same pattern, and the MSs are seen as fixed from the viewpoint of the MRS but as moving from the viewpoint of the BS, thereby requiring handover. Since the MRS and MSs are moving in the same pattern, they perform handovers approximately at the same time.

The MSs within the moving wireless network maintain their connections to the MRS regardless of the connection status between the MRS and the serving BS. However, since the MRS has to perform handover as an MS, unlike a fixed relay station, it performs cell reselection procedure periodically.

Figure 4:
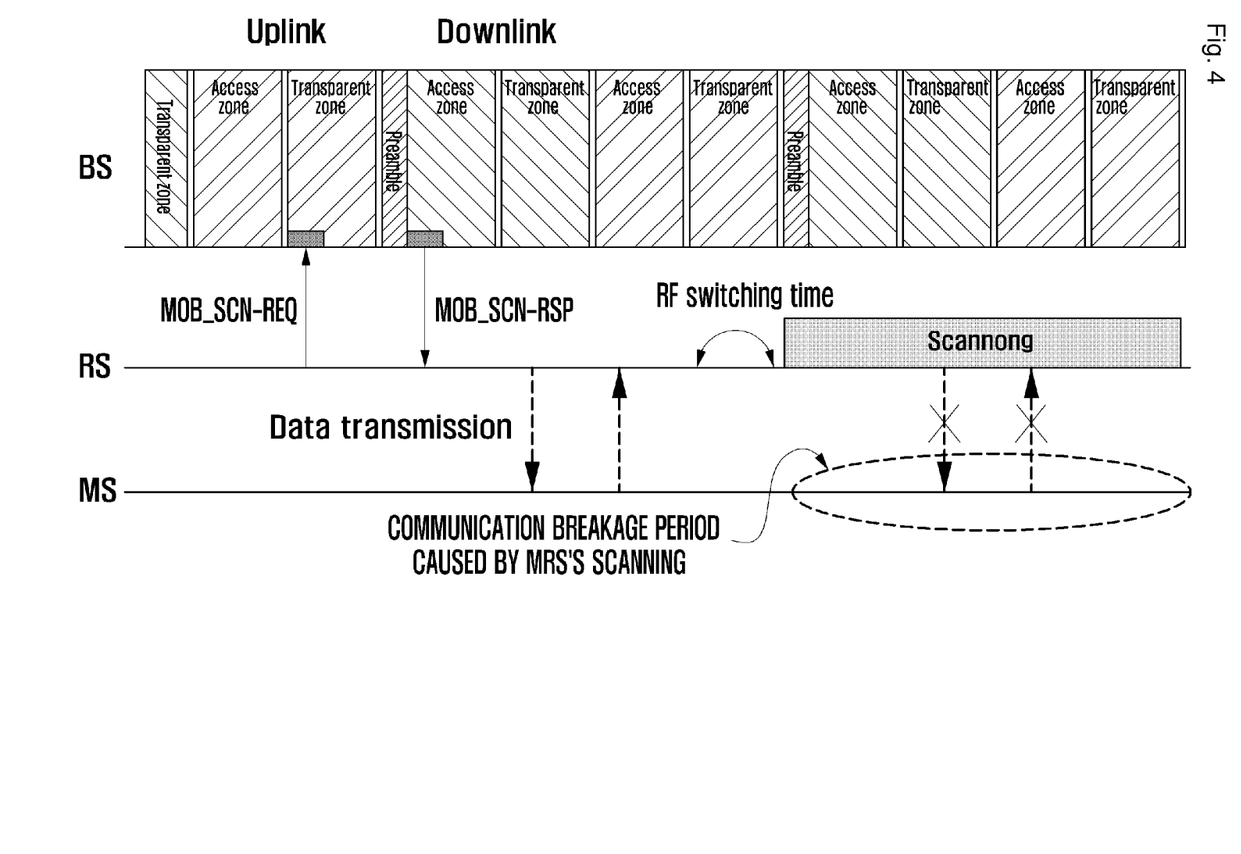
FIG. 4 is a timing diagram illustrating a principle of the conventional cell selection procedure of the MRS and MS in a wireless communication system.
Figure 5:
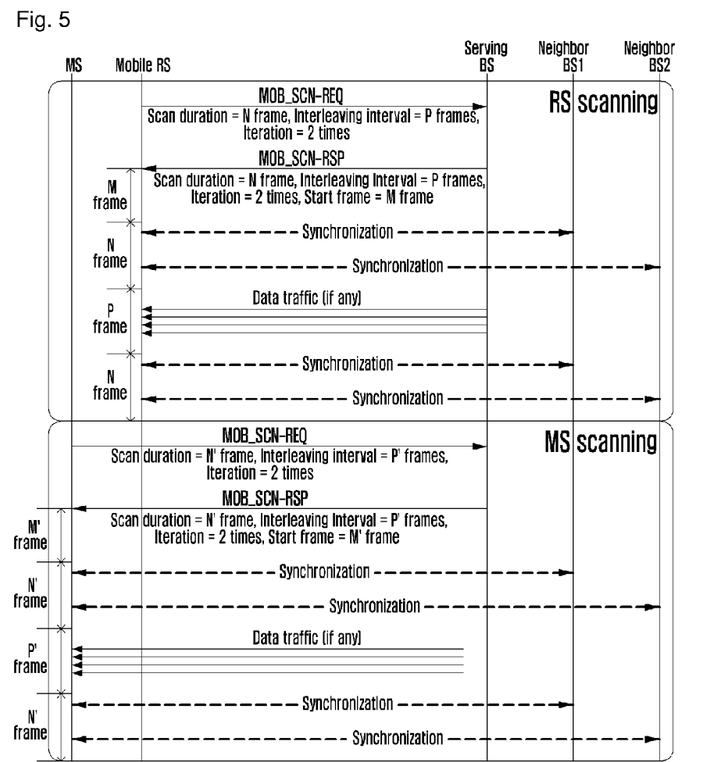
FIG. 5 is a sequence diagram illustrating operations of MS, MRS, and serving and neighbor base stations for the conventional cell reselection procedure in a wireless communication system.

FIG. 4 is a timing diagram illustrating a principle of the conventional cell selection procedure of the MRS and MS in a wireless communication system, and FIG. 5 is a sequence diagram illustrating operations of MS, MRS, and serving and neighbor base stations for the conventional cell reselection procedure in a wireless communication system.

Referring to FIG. 4, the BS communicates with the MRS in Time Division Duplex (TDD) scheme. The MRS exchanges the MOB_SCN-REQ and MOB_SCN-RSP messages with the BS for cell reselection and relays data between the MS and the BS. When searching for the neighbor BSs, the MRS switches to a Radio Frequency (RF) of a neighbor BS and performs scanning for the neighbor BSs. During the scanning procedure of the MRS, the communication with the MS is broken.

While the MRS performs the cell reselection as shown in FIG. 4, the MS cannot receive the packets transmitted by the BS, and the BS cannot receive the packets transmitted by the MS too. In order to solve this problem, the MRS can perform the cell reselection using the neighbor BS information provided by the BS without the cell reselection procedure. In this case, however, the information accuracy decreases, resulting in deterioration of service quality and increase of system complexity. Furthermore, in case that the MS and MRS perform the cell reselection procedures independently, the scanning delay increases, thereby making worse the service quality and reducing the network resource efficiency.

FIG. 5 shows the service loss time increase problem caused by the continuous cell reselection procedures of the MRS and MS in the moving wireless network when the MRS performs scanning for the neighbor BSs. In order to solve this problem, it can be considered to remove the cell reselection procedure of the MS belongs to the moving wireless network. In this case, however, when the MS detaches from the moving wireless network, the MS has no information about neighbor cell, resulting in increase of handover failure rate.

As aforementioned, in the conventional cell selection/reselection method of the MRS in a moving wireless network, the MRS exchanges the scanning information with the serving BS and performs scanning at a predetermined interval in a predetermined duration for handover. However, the conventional cell selection/reselection method has a drawback in that the MS connected to the MRS experiences the service loss while the MRS performs scanning neighbor BSs. The scanning delay of the MRS is prolonged as a number of the neighbor BSs to scan, resulting in deterioration of the service loss problem and unnecessary waste of radio resource. Furthermore, since the MRS performs scanning of the neighbor BS by its lone, it is difficult to expect of diverse scanning results about the neighbor BSs.

DISCLOSURE OF INVENTION

Technical Problem

In order to overcome the above problems of the prior art, the present invention provides a cell reselection method and apparatus for a moving wireless network in a wireless communication system that is capable of avoiding service loss of a mobile station (MS) connected to a mobile relay station (MRS) of the moving wireless network during the neighbor cell scanning of the MRS and overcoming the inefficient cell reselection process of the MS and MRS.

Also, the present invention provides a cell selection/reselection method and apparatus for a moving wireless network in a wireless communication system that is capable of improving cell reselection performance by the cooperation of the MRS and MS belonged to the moving wireless network during the scanning for a potential handover of the MRS.

Solution to Problem

In accordance with an exemplary embodiment of the present invention, a cooperative scanning method for a moving wireless network including a mobile relay station and at least one mobile station includes transmitting, at the moving wireless network, a scanning request with cooperative scanning duration to a serving base station; assigning, when a scanning response, neighbor base stations to the mobile relay station and at least one mobile station; scanning, at the mobile relay station and the at least mobile station, the assigned neighbor base stations; and transmitting scanning results to the serving BS station.

In accordance with another exemplary embodiment of the present invention, a cooperative scanning method for a moving wireless network including a mobile relay station and at least one mobile station in a broadband wireless system includes transmitting, at the mobile relay station, a scanning request with a cooperative scanning duration to a serving base station; transmitting, at the serving base station, a scanning response to the mobile relay station in response to the scanning request; assigning, at the mobile relay station, neighbor base stations to the mobile relay and the at least one mobile station based on the scanning response; scanning, at the mobile relay station and the at least one mobile station, assigned neighbor base stations; and transmitting, at the mobile relay station, scanning results of the mobile relay station and collected from the at least one mobile station.

In accordance with another exemplary embodiment of the present invention, a cooperative scanning method in broadband wireless access system including a moving wireless network having a relay station and at least one mobile station includes transmitting a scanning request with a cooperative scanning duration from the mobile relay station to a serving base station; assigning, at the serving base station, neighbor base stations to the mobile relay station and the at least one mobile station; transmitting a scanning response from the serving base station to the mobile relay station in response to the scanning request; scanning, at the mobile relay station and the at least one mobile station, the assigned neighbor base stations; and reporting, at the mobile relay station, scanning results of the mobile relay station and collected from the at least one mobile station to the serving base station.

In accordance with another exemplary embodiment of the present invention, a scanning system in a broadband wireless access system a serving base station which transmits a scanning response in response to a scanning request and selects neighbor cells according to a scanning result; at least one neighbor base station; and a moving wireless network which scans the at least one base station and comprises at least one mobile station which scans assigned base stations among the at least one neighbor base stations, and a mobile relay station which transmits the scanning request with a cooperative scanning duration to the serving base station, assigns the at least one neighbor base stations to the mobile relay station and the at least one mobile station, scans the assigned base station among the at least one base station, collects scanning results from the at least one mobile station, and reports the scanning results of the mobile relay station and the at least one mobile station to the serving base station.

In accordance with still another exemplary embodiment of the present invention, a scanning system in a broadband wireless access system includes a serving base station which transmits a scanning response in response to a scanning request and selects neighbor cells according to a scanning result; at least one neighbor base station; and a moving wireless network which includes a mobile relay station and at least one mobile station scanning the at least one base station, wherein the serving base station assigns the at least one neighbor base station to the mobile relay station and at least one mobile station, and the mobile relay station calculates the cooperative scanning duration, transmits the scanning request to the serving base station, scans the assigned neighbor base station among the at least one base station, collects scanning results from the at least one mobile station, and reports the scanning results of the mobile relay station and the at least one mobile station to the serving base station.

Advantageous Effects of Invention

The cell reselection method based on a cooperative scanning according to the present invention is advantageous to avoid service breakage by reducing the scanning duration in the neighbor cell scanning process for a potential handover.

Also, the cell reselection method based on a cooperative scanning according to the present invention is capable of minimizing the scanning duration and unnecessary waste of radio resources by allowing the MRS and MSs connected to a moving wireless network to perform scanning neighbor BSs during a shared scanning duration.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention proposes a cell selection/reselection method to overcome the service breakage of the mobile station during the scanning process of mobile relay station.

In an exemplary embodiment of the present invention, the broadband wireless access system includes a moving wireless network comprising a mobile relay station and at least one mobile station, and the mobile relay station and the at least one mobile station cooperate with each other to measure the received signal strengths of neighbor base stations in the scanning process for cell reselection.

When measuring the received signal strengths of the neighbor base stations, the mobile relay station and the at least one mobile station can be responsible for measuring the received signal strengths of different neighbor base stations. The mobile relay station and the at least one mobile station can use the differences among the received signal strengths measured previously for measuring current received signal strengths of the neighbor base stations.

In an exemplary embodiment of the present invention, the difference between the measurements and scanning duration and start time can be controlled by the access network including the serving base station or the mobile relay station.

In case of the mobile relay station's control, the mobile relay station aggregates the received signal strengths measured by the at least one mobile station to a single message and then sends the message to the serving base station.

In an exemplary embodiment of the present invention, the broadband wireless access system includes a moving wireless network comprising a mobile relay station and at least one mobile station, and the mobile relay station and at least one mobile station measure the received signal strengths of the neighbor base stations during the same duration.

In an exemplary embodiment of the present invention, the mobile relay station can control the scanning time. In case that the mobile relay station controls the scanning time, the mobile relay station can transmit the scanning-related information to the at least one mobile station directly. In this case, the scanning-related information can be transmitted to the individual mobile stations. The scanning-related information can be broadcast by the mobile relay station such that all the mobile stations within the coverage of the mobile relay station can receive the scanning-related information.

In an exemplary embodiment of the present invention, the serving base station can control the scanning time. In case that the serving base station controls the scanning time, the serving base station can transmit the scanning-related information to the individual mobile stations.

In the following descriptions, the terms 'mobile relay stations' and 'MRS' are used synonymously, the terms 'mobile station' and 'MS' are used synonymously, and the terms 'base station' and 'BS' are used synonymously.

Figure 6:
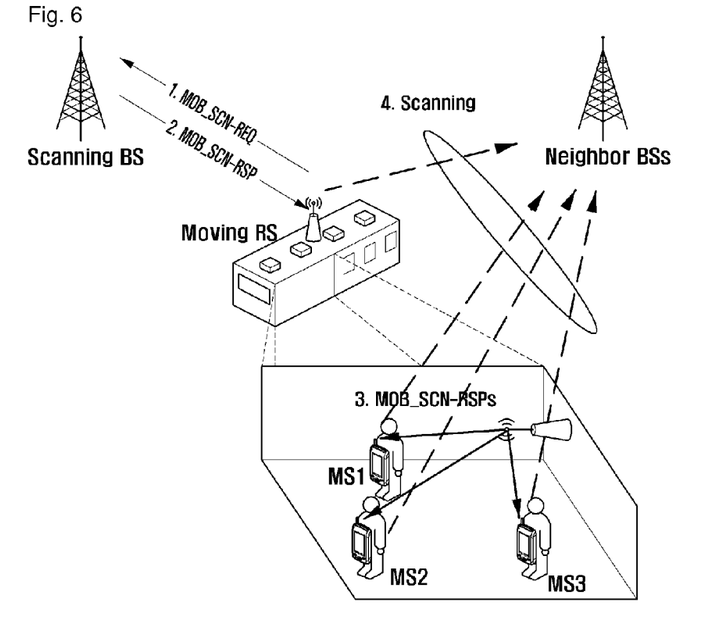
FIG. 6 is a diagram illustrating a broadband wireless access system for explaining the principle of a cell reselection method according to an exemplary embodiment of the present invention.

FIG. 6 is a diagram illustrating a broadband wireless access system for explaining the principle of a cell reselection method according to an exemplary embodiment of the present invention.

Referring to FIG. 6, a MRS measures the received signal strength, e.g. Carrier to Interference plus Noise Radio (CINR) and/or Received Signal Strength Indicator (RSSI), of a serving BS and if the received signal strength is less than a predetermined threshold value, sends a MOB_SCN-REQ message to the serving BS. The MOB_SCN-REQ message includes the information such as neighbor BSs to be scanned, start time of scanning, scanning duration (N frames), interleaving interval (P frames), iteration (n times), scanning type, report type, etc. If the MOB_SCN-REQ message is received, the serving BS generates scanning parameters and sends a MOB_SCN-RSP message including scanning parameters in response to the MOB_SCN-REQ message. The MOB_SCN-RSP message includes the responsive information such as start frame (M frames), scanning duration (N frames), and interleaving interval (P frames), and association information dependant on the scanning type of the MRS such as rendezvous time, CDMA mode, and transmission opportunity.

Upon receipt of the MOB_SCN-RSP message, the MRS performs scanning based on the scanning parameters contained in the MOB_SCN-RSP message. At the same time, the MRS assigns the neighbor BSs for the MSs (MS1, MS2, and MS3) belonged to the moving wireless network to scan. Here, the MRS and the MSs perform the scanning during the same duration. The scanning results are sent to the serving BS or the MRS and the serving BS or the MRS sets the neighbor BSs having high signal qualities as the candidate BSs for a potential handover. In this manner, the neighbor BS scanning duration is reduced by the cooperation of the MRS and the MSs, thereby minimizing the communication breakage caused by the long scanning duration.

Figure 7:
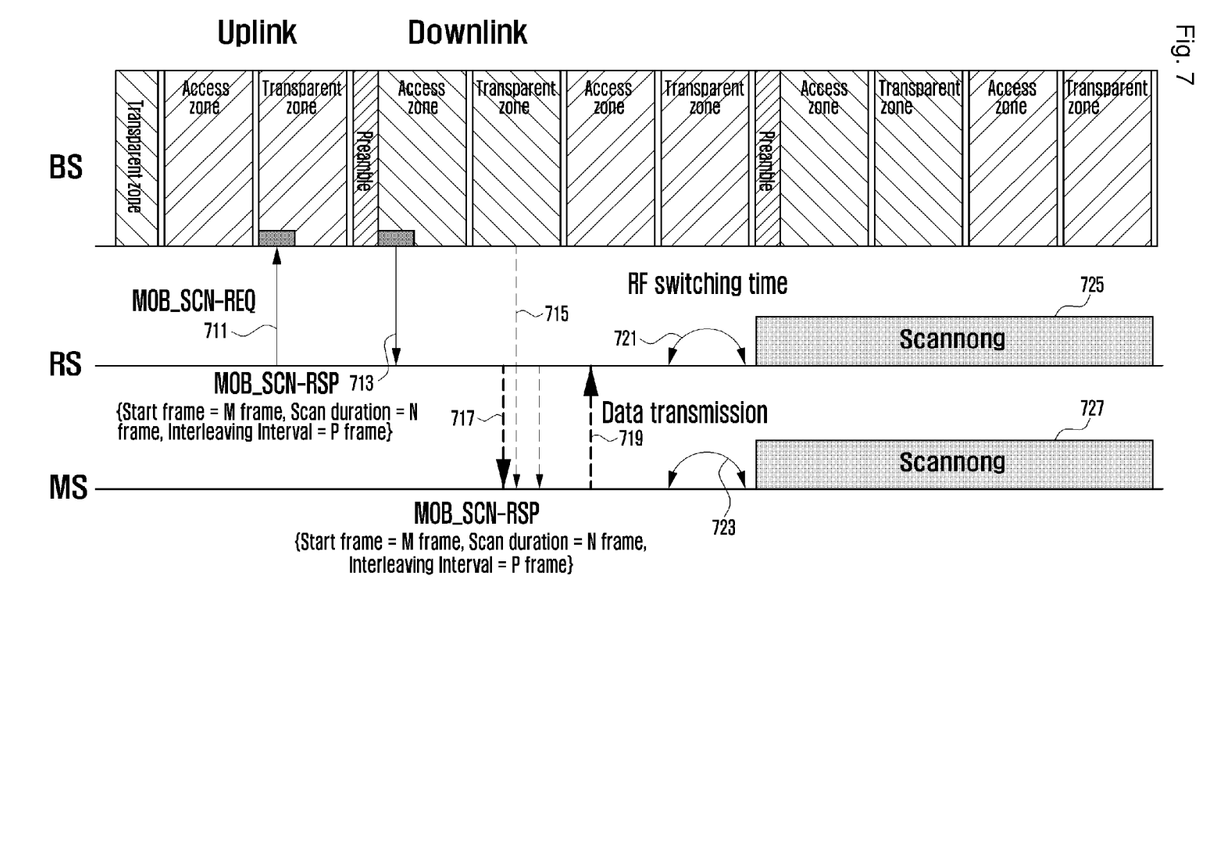
FIG. 7 is a timing diagram illustrating a principle of a cell reselection procedure method based on the cooperation of the MRS and MSs according to an exemplary embodiment of the present invention.

FIG. 7 is a timing diagram illustrating a principle of a cell reselection procedure method based on the cooperation of the MRS and MSs according to an exemplary embodiment of the present invention.

Referring to FIG. 7, the MRS determines a MRS-MS cooperation-based scanning duration and sends a MOB_SCN-REQ message with the scanning parameters to the serving BS (711). Upon receipt of the MOB_SCN-REQ message, the serving BS sends a MOB_SCN-RSP message to the MRS in response to the MOB_SCN-REQ message (713). The MOB_SCN-RSP message includes the start frame (M frame), scanning duration (N frames), interleaving interval (P frames), and iteration times (n times). At this time, at least one MS (e.g. MS1 to MS3) can receive the MOB_SCN-RSP message in order to perform neighbor BS scanning in cooperation with the MRS. The MS can receive the MOB_SCN-RSP message directly from the serving BS or via the MRS. In case that the MS receives the MOB_SCN-RSP message from the MRS, the MRS relays the MOB_SCN-RSP message received from the serving BS to the MS (717). Whereas, in case that the MS receives the MOB_SCN-RSP message from the serving BS, the serving BS sends the MOB_SCN-RSP message to the MS directly at step 715. If the MOB_SCN-RSP message is received, the MS notifies the MRS of the receipt of the MOB_SCN-RSP message (719). Next, the MRS and the MS perform RF switching to connect to the assigned neighbor BSs (721 and 723) and scan the signals of the connected neighbor BSs to acquire synchronization, respectively (725 and 727). At this time, the MRS and MS can connect to the same neighbor BSs or individually assigned neighbor BSs.

As aforementioned, the MRS and the MS (MS1 to MS3 in FIG. 6) belonged to the moving wireless network are scheduled to perform the neighbor BS scanning during the same scanning duration. The MRS received the MOB_SCN-RSP message in response to the MOB_SCN-REQ message sends the MOB_SCN-RSP message to the MS (e.g. MS1 to MS3 in FIG. 6).

The MRS or the serving BS performs synchronization procedure using the scanning information acquired by the MRS and the MS. In order to compensate the difference between the received signal strengths measured by the MRS and the MS, the scanning can be performed to a reference BS. The scanning information is regenerated in consideration of the difference between the measured received signal strengths. As a consequence, the MRS or the serving BS performs the cell reselection based on the more accurate scanning information.

Figure 8:
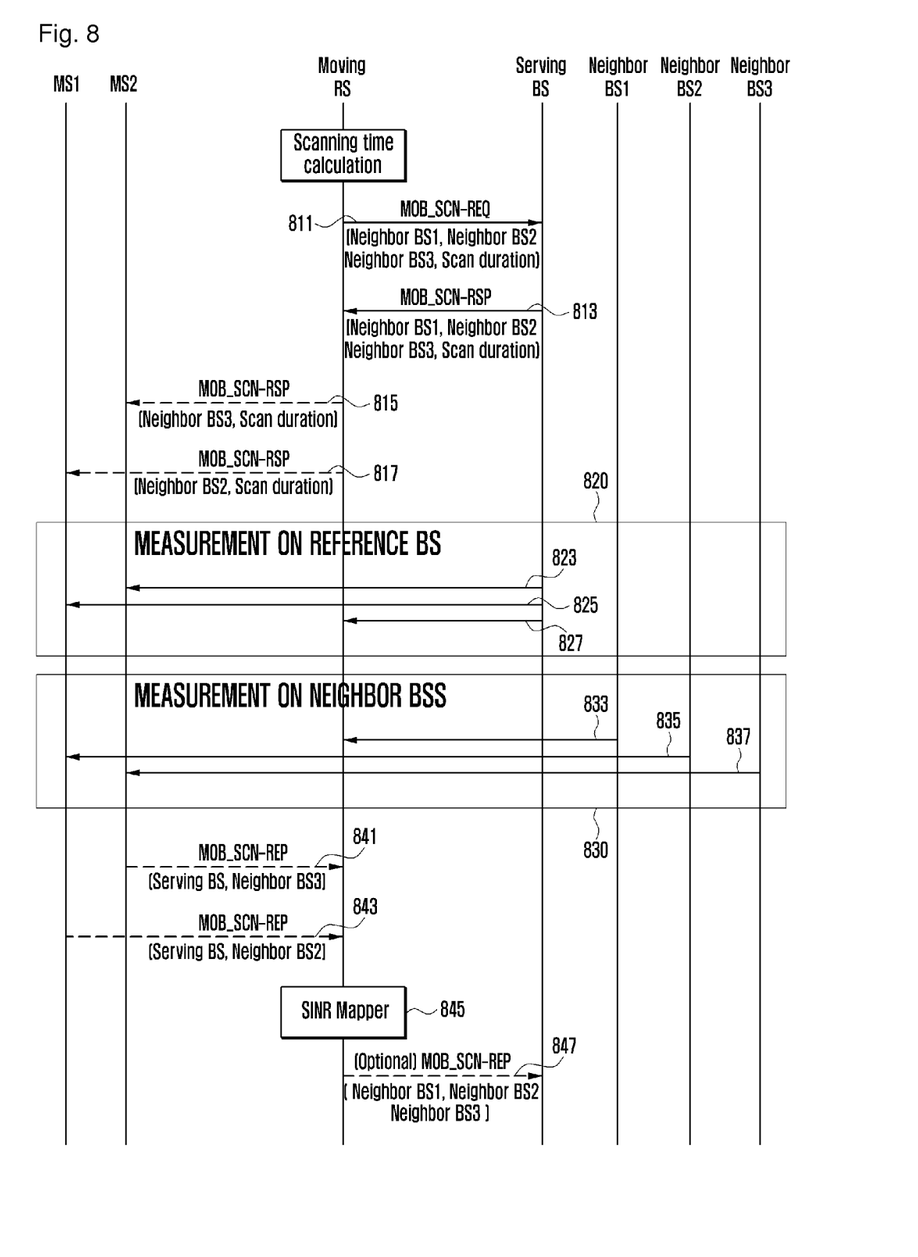
FIG. 8 is a sequence diagram illustrating operations of a MRS, MSs, and serving and neighbor BSs in a wireless communication system for a cell reselection procedure in a wireless communication system according to an exemplary embodiment of the present invention.

FIG. 8 is a sequence diagram illustrating operations of a MRS, MSs, and serving and neighbor BSs in a wireless communication system for a cell reselection procedure in a wireless communication system according to an exemplary embodiment of the present invention. In FIG. 8, the wireless communication system includes three neighbor BSs (BS1, BS2, and BS3) and two MS (MS1 and MS2).

Referring to FIG. 8, first the MRS sends a MOB_SCN-REQ message with the information about the neighbor BS1, neighbor BS2, and neighbor BS3, and scanning duration to the serving BS (811), and the serving BS sends a MOB_SCN-RSP message to the MRS in response to the MOB_SCN-REQ message (813). In the following description, the cell reselection procedure is described with the exemplary case in which the MRS forwards the MOB_SCN-RSP message to the MSs. Upon receipt of the MOB_SCN-RSP message, the MRS forwards the MOB_SCN-RSP message to the MS1 and MS2 at step 815 and 817.

Once the MOB_SCN-RSP message are delivered to the MRS and MSs, the MRS and MS1 and MS2 measure the SINR of the serving BS, independently (820). That is, the MS2, MS1, and MRS measure the SINR of the serving BS at step 823, 825, and 827. Here, the serving BS can be the reference BS. The reason why the MRS and MSs measure the reference BS is to compare the received signal qualities measured at the MRS and MSs. That is, the MS1, MS2, and MRS measure the same reference BS (serving BS in this embodiment) and calculate the difference among the reference BS's signal strengths measured at the MSs and MRS.

At this time, the MRS and MS1 and MS2 are assigned the respective neighbor BSs to scan. The neighbor BSs to be scanned by the MRS and MSs are assigned by the serving BS or the MRS based on the neighbor BS information received from the serving BS.

In case that the serving BS assigns the neighbor BSs to be scanned by the MRS and MSs, the serving BS sends the MRS the information on the neighbor BSs assigned to the respective MRS and MSs in the MOB_SCN-RSP message transmitted at step 813 or in other method. In this case, the MRS sends the assignment information received from the serving BS to the MS1 and MS2 in the respective MOB_SCN-RSP messages.

In case that the MRS assigns the neighbor BSs to be scanned by the MRS and MSs, it is not needed for the MRS to receive the neighbor BS assignment information from the serving BS but to determine the neighbor BSs to be scanned by itself and the MS1 and MS2.

In an exemplary embodiment of the present invention, it can be possible for the serving BS to send the MOB_SCN-RSP message to the MS1 and MS2 directly. In case that the serving BS assigns the neighbor BSs to be scanned by the MRS and MSs and informs the MRS and MSs of the assignments independently, the serving BS sends the MRS and MSs the individual MOB_SCN-RSP messages containing the identifiers of the neighbor BSs assigned to the respective MRS and MSs. For instance, the MOB_SCN-RSP message destined to the MRS includes the neighbor BS2, the MOB_SCN-RSP message destined to the MS1 includes the neighbor BS3, and the MOB_SCN-RSP message destined to the MS2 includes the neighbor BS3. In another case that the MRS assigns the neighbor BSs to be scanned by the MRS and MSs, the MRS sends the assignment information to the serving BS by means of the MOB_SCN-REQ message transmitted at step 811 or in other method, and the serving BS sends the MOB_SCN-RSP messages containing the assignment information to the individual MRS and MSs.

In an exemplary embodiment of the present invention, the MRS assigns the neighbor BSs to be scanned by the MRS and MSs. In FIG. 8, it is assumed that the MRS scans the neighbor BS1, the MS1 scans the neighbor BS2, and the MS2 scans the neighbor BS3. Accordingly, if the neighbor BS scanning starts, the MRS, MS1, and MS2 measure the SINRs of the neighbor BS1, neighbor BS2, and neighbor BS3 assigned thereto respectively. In this case, the MRS and MSs (MS1 and MS2) scan the signals of the neighbor BSs (833, 835, and 837). Once the scanning has completed, the MS1 and MS2 send MOB_SCN-REP messages with the scanning results on the neighbor BS1 and neighbor BS2 and the measurements on the reference BS to the MRS (843 and 841). The MRS analyzes the neighbor BSs' and reference BS's SINR values measured by the MS1 and MS2 and by itself, performs an SINR mapping operation to compensate the differences among the measurements, and sends a MOB_SCN-REP message with the SINR-mapped scanning result values of the reference BS (serving BS in the embodiment) and the neighbor BSs to the serving BS (847). Here, step 847 is optional so as to be or not to be performed by the MRS. That is, the handover of the MRS can be triggered by the MRS or the serving BS received the report from the MRS.

As aforementioned, the MSs and the MRS perform scanning on the same reference BS (serving BS in FIG. 8) and then calculates the difference among the reference BS's received signal strengths measured at the MSs and MRS. Next, the MRS and MSs perform scanning the neighbor BSs assigned thereto respectively. Finally, the MSs send the scanning results to the MRS or the serving BS. The MRS or the BS received the scanning results from the MSs calculates the differences among the reference BS's received signal strengths measured at the respective MRS and MSs and compensates the received signal strengths based on the calculated difference values.

Since the MRS and MSs perform scanning to the fairly assigned number of neighbor BSs in cooperation with each other during the same scanning duration, it is possible to reduce the scanning time, thereby avoiding the service breakage caused by the long scanning delay. That is, the cooperative scanning of the MRS and MSs according to the present invention reduces the scanning time, resulting in improvement of service quality. Also, the cooperative scanning method of the present invention allow the MRS and MSs to scanning independently so as to increase the available resources and minimize the connection breakage time, resulting in increase of entire network throughput.

The cell reselection method according to an exemplary embodiment of the present invention can be summarized as following. First, the MRS calculates the cooperative scanning time of the MRS and MSs. Second, the MRS and MSs scan the neighbor BSs assigned thereto respectively. Third, the MRS calculates the differences among the received signal strengths measured by the MRS and MSs. Fourth, the MRS or the serving BS selects one of the neighbor BSs based on the scanning results of the MRS and MSs.

The cooperative cell reselection method according to an exemplary embodiment of the present invention is described hereinafter. In the cooperative cell reselection method according to an exemplary embodiment of the present invention, the MRS calculates the scanning time $T_{scanning}$ using equation (1).

$$T_{scanning} = (t_{RF\ switching} + t_{preamble\ sensing\ time}) \times \left(\frac{N_{Neighbor\ BS}}{N_{MS}+1} + 1\right) \times N_{iteration} \quad (1)$$

where $t_{RF\ switching}$ denotes the time required for switching RF channel, $t_{preamble\ sensing\ time}$ denotes the time required for scanning signals of neighbor BSs, $N_{Neighbor\ BS}$ denotes a number of neighbor BSs to be scanned, $N_{iteration}$ denotes a number of scanning iterations, and $N_{MS}$ denotes a number of MSs connected to the MRS in a moving wireless network.

Next, the MRS and MSs start scanning the neighbor BSs.

In order to acquire the neighbor BS information for a potential handover, the MRS calculates the scanning time using equation (1) and sends a MOB_SCN-REQ message to the serving BS periodically or when a report event is fulfilled. If the MOB_SCN-REQ message is received, the serving BS sends a MOB_SCN-RSP message with the scanning parameters to the MRS. The scanning parameters include scanning duration, scanning start time, iteration, interleaving interval, and report type. If the MOB_SCN-RSP message is received from the serving BS, the MRS delivers the MOB_SCN-RSP message (or the scanning parameters per MS) to the MSs connected to the moving wireless network.

At this time, the MRS selects one of the neighbor BSs as a reference BS and assigns the rest neighbor BSs to be scanned in two methods. In the first method, the MRS groups the rest neighbor BSs into a number of scanning groups as many as the MRS and MSs and assign the scanning groups to the corresponding stations (including MRS itself and the MSs). In the second method, the MRS assigns all the rest neighbor BSs to each of MRS itself and the MSs.

In case that the scanning parameters generated by the serving BS are provided to only the MRS, the serving BS sends the MRS the MOB_SCN-RSP message with the information on the entire neighbor BSs to be scanned and the scanning duration set by the MRS. The MRS received the MOB_SCN-RSP message makes a scheduling decision such that such that each of the MSs and MRS itself scans the entire neighbor BSs or the MRS and MSs scan corresponding scanning groups of the neighbor BSs respectively. At this time, the same scanning duration and scanning start time are applied to the MRS and MSs, and the report type is set to event-triggered report. This is for the MRS or the serving BS to collect the scanning results of the MRS and MSs belonged to the moving wireless network independently.

Next, the MRS or the serving BS obtains the differences of the received signal strengths measured at the MRS and MSs.

In order to obtains the differences of the received signal strengths measured at the MRS and MSs, the MRS or the serving BS first calculates difference of the reference BS's received signal strengths measured at the MRS and each MS.

The reference difference $D_{SQ,i}$ of the reference BS's received signal strengths measured at the MRS and each MS is calculated using equation (2).

$$D_{SQ,i} = \text{Signal\_quality}_{MRS} - \text{Signal\_quality}_{MS_i} \quad (2)$$

where $\text{Signal\_quality}_{MRS}$ is the reference BS's received signal strength measured at the MRS, and $\text{Signal\_quality}_{MS_i}$ is the reference BS's received signal strength measured at ith MS connected to the moving wireless network.

The MRS or the serving BS stores and updates the reference difference $D_{SQ,i}$ at every scanning process. After performing the cooperative scanning process, the MRS or the serving BS estimates each neighbor BS's signal quality by compensating the corresponding BS's received signal strength measured at each MS using equation (3).

$$\text{estimated\_Signal\_quality}_{MRS_i}^{j^{th}BS} = \text{Signal\_quality}_{MS_i}^{j^{th}BS} + D_{SQ,i} \quad (3)$$

where $\text{Signal\_quality}_{MS_i}^{j^{th}BS}$ is the $j^{th}$BS's received signal strength measured at the $i^{th}$MS, and $D_{SQ,i}$ is a reference value calculated using equation (2).

Finally, the MRS collects and reports the scanning results to the serving BS to reselect one of the neighbor BSs.

The scanning results of the MRS and MSs can be transmitted to the serving BS independently or aggregated by the MRS and then transmitted to the serving BS. In case that the MSs and MRS perform scanning for the different scanning groups of the neighbor BSs, the signal quality of each neighbor BS can be compensated using the differences between the received signal strengths measured at the MRS and the MSs. The scanning results on the neighbor BSs that are collected as above can be used to configure the handover candidate BSs for a potential handover. In order to reduce the scanning time, the scanning process is performed in descending order of received signal strength and the neighbor BS of which received signal strength is less than a threshold value is removed from the neighbor BS information.

Figure 9:
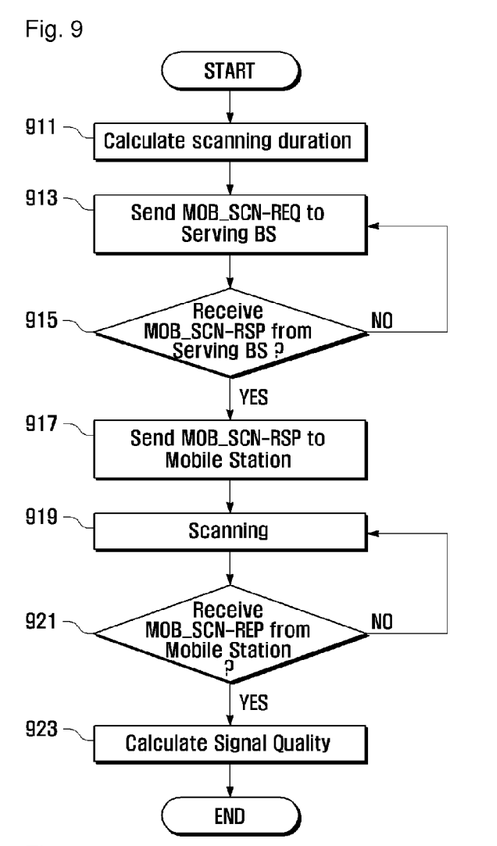
FIG. 9 is a flowchart illustrating a cell reselection method based on the cooperative scanning according to an exemplary embodiment of the present invention.

FIG. 9 is a flowchart illustrating a cell reselection method based on the cooperative scanning according to an exemplary embodiment of the present invention.

Referring to FIG. 9, an MRS calculates a scanning time for scanning neighbor BSs in cooperation with MSs connected to the same moving wireless network using equation (1) (911). That is, the MRS calculates the scanning duration using equation (1), periodically or when a scanning trigger event is fulfilled, to initiate scanning for acquiring the information on the neighbor BSs for a potential handover. Next, the MRS sends a MOB_SCN-REQ message to the serving BS to request for a cell reselection procedure (913) and waits for receiving an MOB_SCN-RSP message (915). If a MOB_SCN-RSP message is received from the serving BS, the MRS sends the MOB_SCN-RSP message with scanning parameters to the MSs (917). The scanning parameters include scanning duration, scanning start time, iteration, interleaving interval, and report type.

After transmitting the MOB_SCN-REQ message at step 913, the MRS determines whether a MOB_SCN-RSP message is received (915). If the MOB_SCN-RSP message is received, the MRS sends the MOB_SCN-RSP message to all the MSs connected to the moving wireless network for assigning the neighbor BSs to be scanned by the MSs (917). At this time, the MRS can assign the neighbor BSs such that each of the MSs and MRS itself scans the entire neighbor BSs, or the MSs and MRS scan corresponding scanning groups of the neighbor BSs, or the MSs and MRS scan the neighbor BSs overlappingly.

In case that the scanning parameters generated by the serving BS are provided to only the MRS, the serving BS sends the MRS the MOB_SCN-RSP message with the information on the entire neighbor BSs to be scanned and the scanning duration set by the MRS. The MRS received the MOB_SCN-RSP message makes a scheduling decision such that such that each of the MSs and MRS itself scans the entire neighbor BSs or the MRS and MSs scan corresponding scanning groups of the neighbor BSs respectively. At this time, the same scanning duration and scanning start time are applied to the MRS and MSs, and the report type is set to event-triggered report. This is for the MRS or the serving BS to collect the scanning results of the MRS and MSs belonged to the moving wireless network independently.

Next, the MRS scans the neighbor BSs assigned to itself (919). At this time, the MSs also scan the assigned neighbor BSs, and the MRS obtains the differences of the received signal strengths measured at the MRS and MSs. Here, the MRS calculates a difference value between the reference BS's received signal strengths measured at the MRS and each MS using equation (2) and estimates each neighbor BS's signal quality by compensating the corresponding BS's received signal strength measured at each MS using equation (3).

As aforementioned, the MRS and MSs perform scanning to measure the received signal strengths of the neighbor BSs. After completion of the scanning process, the MSs report the measurements to the MRS, and the MRS determines whether MOB_SCN-REP messages are received from all the MSs (921). Once the MOB_SCN-REP messages are received from all the MSs, the MRS calculates the signal qualities of the neighbor BSs using the scanning results contained in the MOB_SCN-REP messages (923). The scanning results of the MRS and MSs can be transmitted to the serving BS directly or aggregated by the MRS and then transmitted to the serving BS. In case that the MRS and MSs scan the different groups of neighbor BSs, the measurements can be compensated using the differences between the received signal strengths measured at the MRS and MSs. The scanning results on the neighbor BSs that are collected as above can be used to configure the handover candidate BSs for a potential handover. In order to reduce the scanning time, the scanning process is performed in descending order of received signal strength and the neighbor BS of which received signal strength is less than a threshold value is removed from the neighbor BS information.

Figure 10:
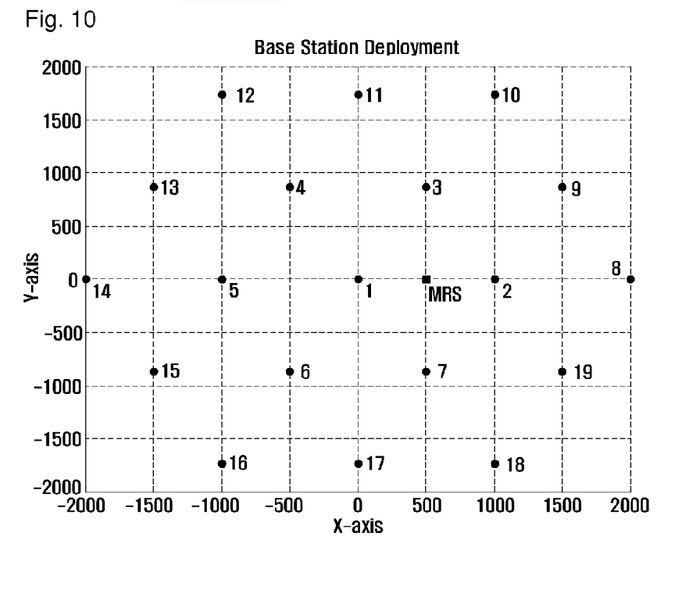
FIG. 10 is a graph illustrating an exemplary deployment of the cells for performance simulation of the cell reselection method based on the cooperative scanning strategy according to an exemplary embodiment of the present invention.
Figure 11:
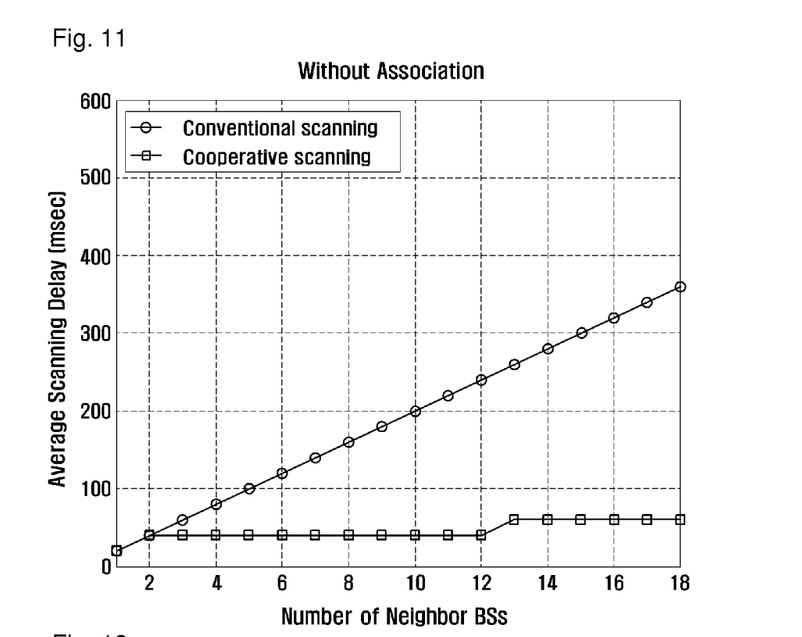
FIG. 11 is a graph illustrating variations of average scanning delays as the number of neighbor BSs increases, without association, in a conventional scanning method and a cooperative scanning method according to an exemplary embodiment of the present invention.
Figure 12:
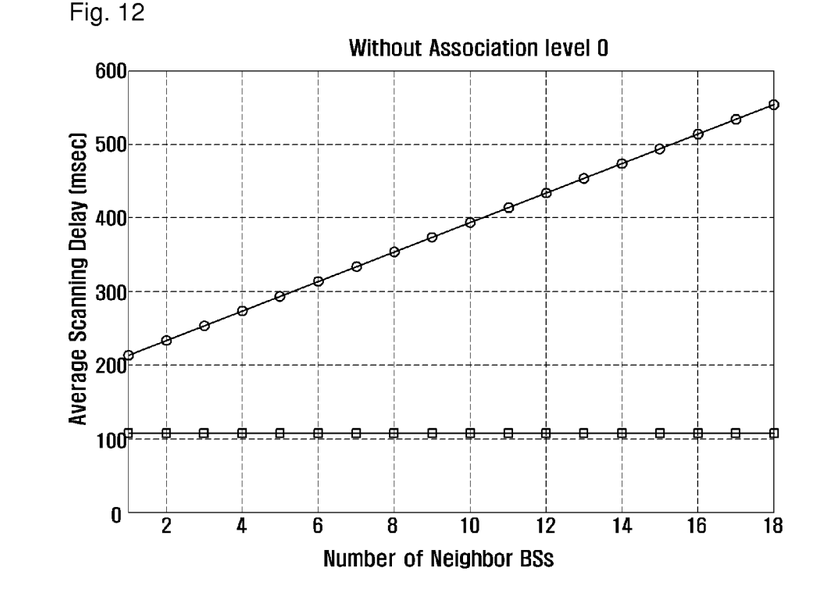
FIG. 12 is a graph illustrating variations of average scanning delays as the number of neighbor BSs increases, with association, in the conventional scanning method and a cooperative scanning method according to an exemplary embodiment of the present invention.
Figure 13:
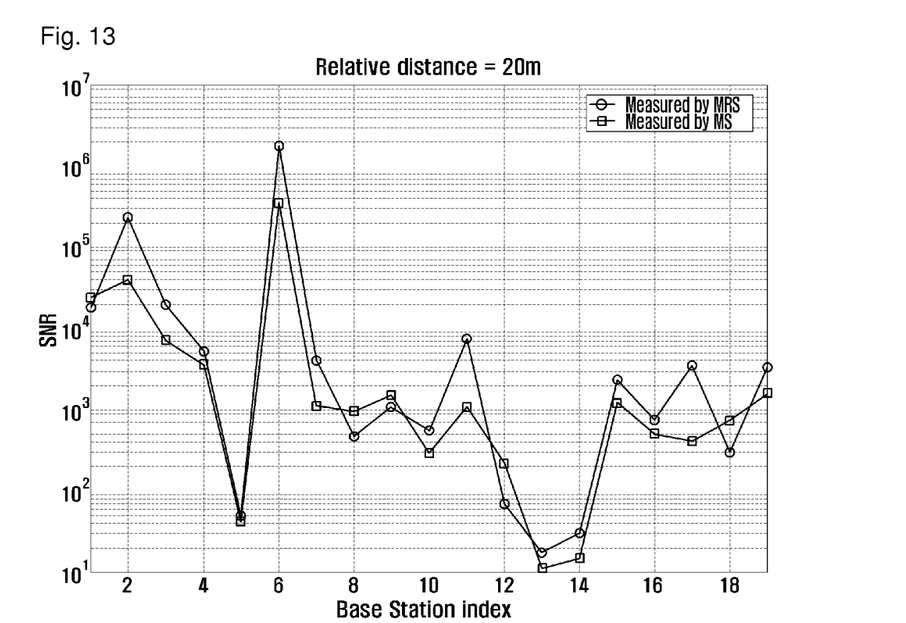
FIG. 13 is a graph illustrating the differences of the neighbor BSs' received signals qualities measured at an MRS and an MS in the cooperative scanning method according to an exemplary embodiment of the present invention.
Figure 14:
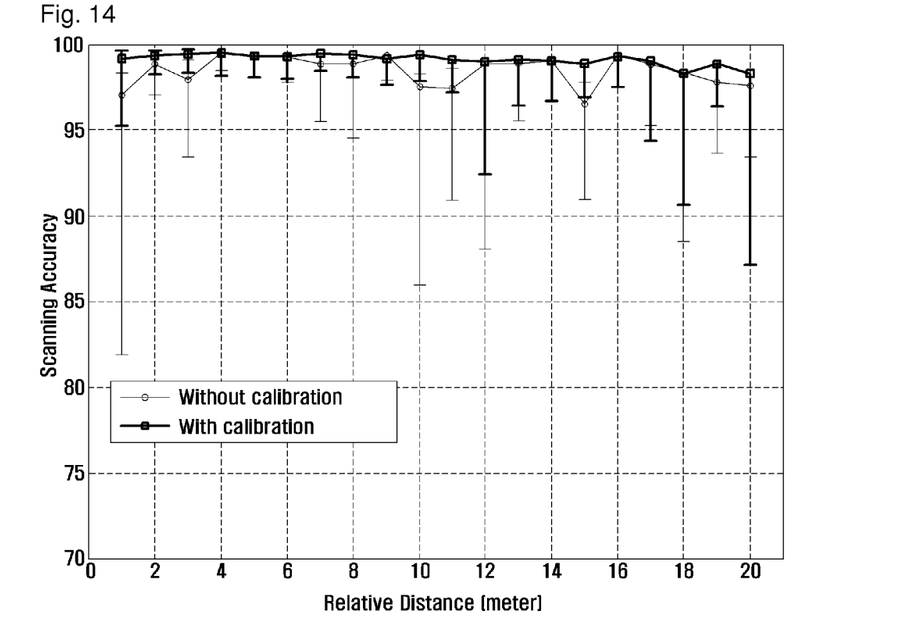
FIG. 14 is a graph illustrating variation of scanning accuracies of the cooperative scanning method according to an exemplary embodiment of the present invention with or without calibration as the distance between the MRS and MS increases.

FIG. 10 is a graph illustrating an exemplary deployment of the cells for performance simulation of the cell reselection method based on the cooperative scanning strategy according to an exemplary embodiment of the present invention. FIGS. 11 and 12 are graphs illustrating performance simulation results of the conventional cell reselection method and a cooperative scanning-based cell reselection method according to an exemplary embodiment of the present invention. FIG. 13 is graph illustrating received signal strengths of neighbor base stations at measured at an MRS and a MS in a cell reselection method according to an exemplary embodiment of the present invention. FIG. 14 is a graph illustrating scanning accuracies with and with calibration in the MRS-MS cooperative scanning of a cell reselection method according to an exemplary embodiment of the present invention.

In order to validate the performance improvement of the cooperative scanning-based cell reselection method according to an exemplary embodiment of the present invention, the cells are arranged as shown in FIG. 10, and the performance simulation is conducted with the parameters listed in table 1.

TABLE 1

| Simulation Parameters | | |
|---|---|---|
| Number of BS | 19 BS | |
| Cell radius | 557 m | |
| Mobility model | Speed | 200 Km/h |
| | direction | Fixed direction |
| Channel model | Path loss exponent | 3.5 |
| | Shadowing model | Long-normal dist. (mean: 0 dB, standard deviation: 5 dB) Correlation distance (50 m) |
| | Thermal Noise Density | −174 dBm/Hz |
| System parameter | | |
| Bandwidth | | 10 MHz |
| Frame size | | 5 msec |
| Synchronization + RF switching time | | 2~15 msec (Uniform dist.) + 5 msec |
| Backoff exponent | | 4 |
| Contention slot per frame | | 2 slot |
| RNG-RSP time out | | 50 msec |
| Maximum BS transmission power | | 53 dBm |
| BS transmit antenna gain | | 14 dBi |
| MS receive antenna gain | | 12 dBi |
| MRS receive antenna gain | | 14 dBi |

FIG. 11 shows variations of average scanning delays as the number of neighbor BSs increases, without association, in a conventional scanning method and a cooperative scanning method according to an exemplary embodiment of the present invention, and FIG. 12 shows variations of average scanning delays as the number of neighbor BSs increases, with association, in the conventional scanning method and a cooperative scanning method according to an exemplary embodiment of the present invention. The scanning delay in the conventional scanning method can be calculated using equation (4).

$$d_{MRS}^{Conv} = (t_{RF\_switching} + t_{preamble}) \times N_{Neighbor\_BS} \times N_{iteration} \quad (4)$$

where $t_{RF\_switching}$ is the RF switching time, $t_{preamble}$ is neighbor BS signal scanning time, $N_{Neighbor\_BS}$ is the number of neighbor BSs, and $N_{iteration}$ is the number of scanning times.

As shown in the simulation result of FIG. 11, the average scanning delay increases linearly as the number of neighbor BSs increases when using the conventional scanning method without association. Whereas, the cooperative scanning method according to an exemplary embodiment of the present invention shows constant low average scanning delay regardless of the increase of the number of neighbor BSs. This is because the cooperative scanning method of the present invention distributes the scanning burden of the MRS to the MSs so as to reduce As shown in the simulation result of FIG. 12, the conventional scanning method with association shows longer average scanning delay as the number of neighbor BSs increases compared to when the association is not used, while the cooperative scanning method according to an exemplary embodiment of the present invention shows a tiny variation of the average delay but still low. This is because, in the cooperative scanning method according to an exemplary embodiment of the present invention, the MRS and MSs shares the scanning time, and the MRS performs scanning the neighbor BSs assigned thereto with association while the MSs perform scanning other neighbor BSs assigned respectively thereto.

FIG. 13 shows the differences of the neighbor BSs' received signals qualities measured at an MRS and an MS in the cooperative scanning method according to an exemplary embodiment of the present invention. The MRS and MS have been placed with the relative distance of 20 m, and SNR is used as a metric to assess the signal quality. As shown in FIG. 13, the SNRs measured at the MRS and the MS show similar characteristics. But, in any case, the difference between the SNRs measured at the MRS and the MS is about 10 dB. Accordingly, there is a need to compensate the measurement difference between the MRS and MS.

FIG. 14 shows variation of scanning accuracies of the cooperative scanning method according to an exemplary embodiment of the present invention with or without calibration as the distance between the MRS and MS increases. The scanning accuracy has been calculated using equation (5).

$$\text{Accuracy}(\%) = 100 - \left| \frac{\text{Signal\_quality}_{MRS}^{j^{th}BS} - \text{estimated\_Signal\_quality}_{MRS}^{j^{th}BS}}{\text{Signal\_quality}_{MRS}^{j^{th}BS}} \right| 100 \quad (5)$$

where $\text{Signal\_quality}_{MRS}^{j^{th}BS}$ is a on the $j^{th}$ neighbor BS's received signal strength measured at the MRS and $\text{estimated\_Signal\_quality}_{MRS}^{j^{th}BS}$ is a received signal strength calculated using equation (3). As shown in FIG. 14, when the distance between the MRS and the MS is short the scanning accuracy is high and improved to the extent over 95% with calibration. As the distance between the MRS and the MS increases, the scanning accuracy decreases. Also, the scanning accuracy is high with good SNR but decreases with relatively bad SNR. This means that the scanning accuracy can be further improved by performing additional scanning to the neighbor BS showing high SNR in the cooperative scanning method according to an exemplary embodiment of the present invention.

As described above, the cell reselection method based on a cooperative scanning according to the present invention reduces the scanning duration in the neighbor cell scanning process for a potential handover, thereby avoiding service breakage.

Also, the cell reselection method based on a cooperative scanning according to the present invention allows the MRS and MSs connected to a moving wireless network to perform scanning neighbor BSs during a shared scanning duration, thereby minimizing the scanning duration and, as a consequence, avoiding service breakage and reducing unnecessary waste of radio resources.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A cooperative scanning method for a mobile relay station in a moving wireless network, the cooperative scanning method comprising:
    transmitting, by a mobile relay station, a scanning request with cooperative scanning duration to a serving base station;
    assigning neighbor base stations to the mobile relay station and at least one mobile station upon receiving a scanning response from the serving base station;
    transmitting, to the at least one mobile station, messages informing of the neighbor base stations assigned to the at least one mobile station;
    scanning the neighbor base stations assigned to the mobile relay station and the at least one mobile station; and
    transmitting scanning results to the serving base station.

2. The cooperative scanning method of claim 1, wherein scanning the assigned neighbor base stations comprises:
    measuring a received signal strength of a reference base station;
    receiving, from the at least one mobile station, a received signal strength of a reference base station measured at the at least one mobile station;
    calculating a difference between the received signal strengths measured at the mobile relay station and the at least one mobile station; and
    compensating scanning results using the difference.

3. The cooperative scanning method of claim 2, wherein assigning neighbor base stations comprises allocating different neighbor base stations to the mobile relay station and the at least one mobile station.

4. A cooperative scanning method for a base station in a broadband wireless system, the cooperative scanning method comprising:
    receiving a scanning request, at the base station, with a cooperative scanning duration from a mobile relay station;
    transmitting, by the base station, a scanning response to the mobile relay station in response to the scanning request; and receiving, from the mobile relay station, scanning results of the mobile relay station and collected from at least one mobile station, wherein neighbor base stations are assigned by the base station to the mobile relay station and the at least one mobile station based on the scanning response and the scanning results, at the mobile relay station and the at least one mobile station.

5. The cooperative scanning method of claim 4, wherein different neighbor base stations are allocated to the mobile relay station and the at least one mobile station.

6. The cooperative scanning method of claim 5, wherein the scanning results are compensated based on a pre-calculated difference between the received signal strengths measured at the mobile relay station and the at least one mobile station.

7. The cooperative scanning method of claim 6, wherein the mobile relay station controls a scanning duration and scanning start time.

8. A cooperative scanning method for a base station in a moving wireless network, the cooperative scanning method comprising:
receiving, at the base station, a scanning request with a cooperative scanning duration from a mobile relay station;
assigning neighbor base stations, by the base station, to the mobile relay station and at least one mobile station;
transmitting, by the base station, a scanning response to the mobile relay station in response to the scanning request, the scanning response including results of the assigning; and
receiving, by the base station, from the mobile relay station, scanning results of the mobile relay station and collected from the at least one mobile station.

9. A mobile relay station for cooperatively scanning in a moving wireless network, the mobile relay station comprising:
a transmitter, at the mobile relay station, configured to transmit a scanning request with cooperative scanning duration to a serving base station; and
a receiver, at the mobile relay station, configured to receive a scanning response from the serving base station,
wherein the serving base station assigns neighbor base stations to the mobile relay station and at least one mobile station upon receiving the scanning request and scans the neighbor base stations assigned to the mobile relay station, and
wherein the transmitter, at the mobile relay station, transmits, to the at least one mobile station, messages informing of the neighbor base stations assigned to the at least one mobile station and transmits scanning results to the serving base station.

10. A base station for cooperatively scanning in a moving wireless network, the base station comprising:
a receiver, at the base station, configured to receive, from a mobile relay station, a scanning request with a cooperative scanning duration and scanning results of the mobile relay station and collected from at least one mobile station; and
a transmitter, at the base station, configured to transmit a scanning response to the mobile relay station in response to the scanning request,
wherein neighbor base stations are assigned by the base station to the mobile relay and the at least one mobile station based on the scanning response and the scanning results, at the mobile relay station and the at least one mobile station.

11. A base station for cooperatively scanning in a moving wireless network, the base station comprising:
a receiver, at the base station, configured to receive, from a mobile relay station, a scanning request with a cooperative scanning duration and scanning results of the mobile relay station and collected from at least one mobile station; and
a transmitter, at the base station, configured to transmit a scanning response to the mobile relay station in response to the scanning request,
wherein the base station assigns neighbor base stations to the mobile relay station and the at least one mobile station and wherein the scanning response includes results of the scanning at the mobile relay station and the at least one mobile station.

* * * * *